July 12, 1927.  
H. PEIGNÉ  
1,635,496  
FLEXIBLE COUPLING  
Filed March 9, 1926    3 Sheets-Sheet 1

Inventor.  
Henri Peigné  
by S. Sorval.  
Attorney.

July 12, 1927. 1,635,496
H. PEIGNÉ
FLEXIBLE COUPLING
Filed March 9, 1926  3 Sheets-Sheet 2

Inventor.
Henri Peigné
by S. Sokal
attorney.

July 12, 1927.

H. PEIGNÉ

FLEXIBLE COUPLING

Filed March 9, 1926   3 Sheets-Sheet 3

1,635,496

Inventor
Henri Peigné
by S. Sokal
Attorney

Patented July 12, 1927.

1,635,496

UNITED STATES PATENT OFFICE.

HENRI PEIGNÉ, OF BILLANCOURT, FRANCE.

FLEXIBLE COUPLING.

Application filed March 9, 1926, Serial No. 93,495, and in France March 27, 1925.

The present invention relates to flexible couplings, more particularly to flexible couplings for the conveying of rotary motion, of the kind comprising one or more helical springs. According to the invention the coils of the springs are stayed or reinforced by connecting members which prevent or reduce radial compression of the coils and also excessive deformation of the coils, said connecting members being preferably diametrically arranged so as to connect diametrically opposite points of the coils. It is preferred to use springs made of comparatively thin strips or bands bent in their own plane, that is in such a manner that the longest symmetrical axis of the section of the band is at right angles to the longitudinal axis of the spring. It is also preferred to use double or multiple springs, that is to say, springs composed of two or more single springs of the same pitch and diameter in a manner similar to the arrangement of the threads of a multiple screw. In the case of double or multiple springs the diametrical staying members are preferably used to connect diametrically opposite points of adjacent helical springs, that is, one end of the staying member is connected to a point of one helical spring and the opposite end of the member is fixed to a diametrically opposite point of the adjacent parallel spring.

It will be understood that the term "helical spring" is used in a wide sense and includes for instance cylindrical, conical, oval and prismatic springs.

The accompanying drawings illustrate by way of example various embodiments and modes of application of the invention.

Figure 1:
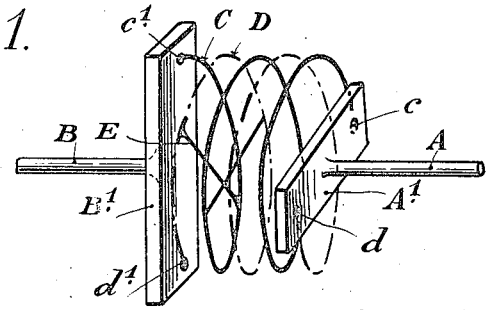
Fig. 1 is a diagrammatic perspective view of a coupling according to the invention, comprising a double helical spring, and staying members connecting opposite points of adjacent coils of the two single springs.

Fig. 1 shows diagrammatically a coupling adapted for conveying continuous or alternating rotary motion from a driving shaft A to a driven shaft B which may be arranged at any desired fixed or variable angular position relatively to each other. The coupling consists of two helical springs C, D; but if preferred a single spring or a spring composed of more than two single springs might be used. When a double spring is used radial compression of the coils and excessive deformation of the springs is prevented by the employment of diametrical staying members E which connect opposite points of two adjacent coils of the two single springs. It is preferred to use springs of elongated section, the longest symmetrical axis of the section being at right angles to the axis of the spring so that the inner edges $C^2$ and $D^2$ are concentric with and lie inside the outer edges $C^1$, $D^1$. The coupling is thus constituted by two similar or identical and parallel helical springs of the same pitch and diameter, the coils of one spring lying half-way between the coils of the other spring. The diametrical staying members E connect in this case opposite points of coils belonging to two different helices, one end $E^1$ of the staying member being fixed to the helical spring C and the other end $E^2$ being fixed to the adjacent parallel coil of the helical spring D.

Figure 3:
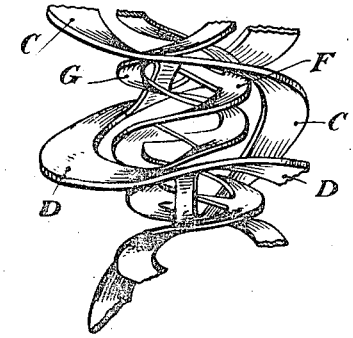
Fig. 3 is a perspective view of a portion of a coupling, comprising two double springs arranged one within the other.

As shown in Fig. 1 the helical spring C is fixed at one end $c$ to the shaft A and at the other end $c^1$ to the shaft B whilst the spring D is likewise fixed at one end $d$ to the shaft A and at the other end $d^1$ to the shaft B. The shafts A and B may be provided with suitable transverse members or arms $A^1$, $B^1$ to which the spring ends are attached. Instead of a double spring of elongated section, two double springs may be used as shown in Fig. 3, the coils of the internal double spring F, G being stayed against each other and the coils of the outer double spring C, D being likewise stayed.

Figure 4:
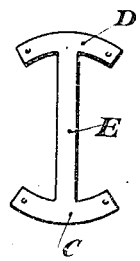
Fig. 4 is a plan of one of the elements from which a coupling according to Fig. 2 may be built up.
Figure 5:
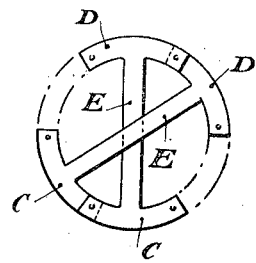
Fig. 5 is a plan showing the manner in which two adjacent elements are connected.

In the practical carrying out of the invention, the coils may be built up of a number of I-shaped elements as shown in Fig. 4. Each of these elements constitutes a sector of an helical spring C and the diametrically opposite sector of the adjacent coil of the helical spring D, the sectors or flanges of the I-shaped elements being connected or stayed by the web portion E. The web portion E may, of course, be either integral with the sectors of the helices C and D or it may be suitably connected thereto. Elements of the shape shown in Fig. 4 may be assembled either by causing their adjacent ends to overlap as shown in Fig. 5, and by riveting the overlapping ends together, or a butt joint may be used.

Figure 6:
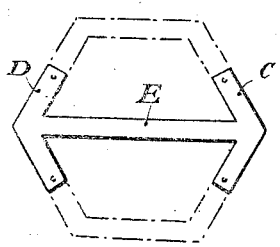
Fig. 6 shows one of the elements from which a double helical coupling of hexagonal shape may be built up.
Figure 7:
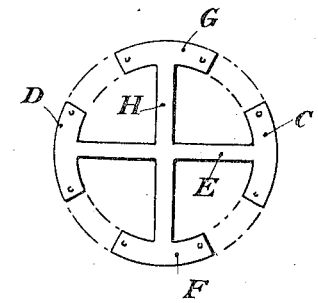
Fig. 7 shows one of the elements from which a quadruple helical coupling may be built up.

Fig. 6 shows an element similar to that shown in Fig. 4 suitable for making a polygonous spring. For making a quadruple spring, an element as shown in Fig. 7 may be used having two cross or web members E, H and four sector portions C, D, F, G.

Figure 13:
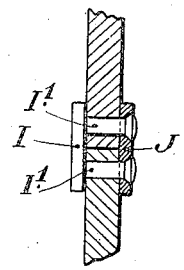
Fig. 13 is a section through two adjacent elements showing their connection by means of the rivet.
Figure 8:
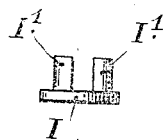
Figs. 8 and 9 show in elevation and plan a rivet used for connecting two adjacent elements such as shown in Fig. 4, the ends of the elements not overlapping but forming a butt joint.
Figure 10:
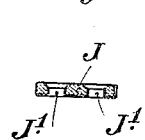
Figs. 10 and 11 show in section and plan a washer or counter-plate co-operating with the rivet.
Figure 12:
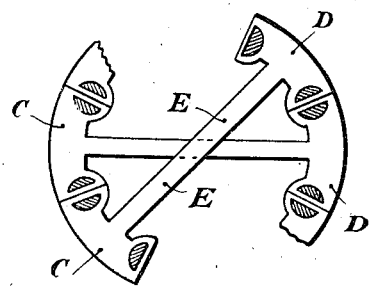
Fig. 12 shows in plan the arrangement of two adjacent elements which are to be connected by means of the rivets.
Figure 9:
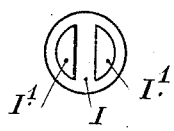
Figure 11:
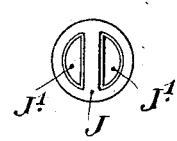

Figs. 8 to 13 show means for making a butt joint with double butt strap. In this case the elements are provided near their ends with semi-circular holes as shown in Fig. 12. Double rivets having swage-head I and two shanks $I^1$, $I^1$ are inserted into these holes. A cover plate J having two openings $J^1$, $J^1$ corresponding to the shanks $I^1$, $I^1$ is then placed upon the shanks and the projecting ends of the shanks are made into half-counter sunk heads as shown in Fig. 13.

Figures 14, 15, 16, 17:
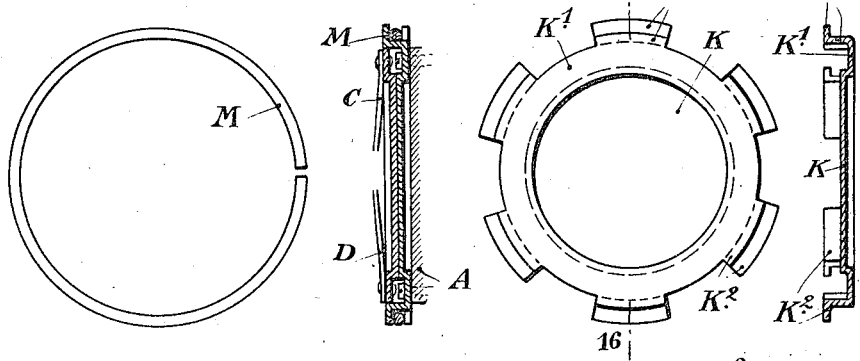
Fig. 14 shows in sectional elevation an arrangement for securing the coupling to a driving or driven shaft or for connecting two couplings to each other.
Fig. 15 is a side view of one of the two halves of the arrangement shown in Fig. 14.
Fig. 16 is a section on line 16—16 of Fig. 15.
Fig. 17 shows a split ring used for connecting the two halves of the arrangement for attaching the coupling.

In order to attach a coupling of the kind described to a driving or driven shaft, or in order to connect together two couplings, the arrangement shown in detail in Figs. 14—17 may be used. This device comprises two discs one of which is shown in elevation in Fig. 15. Each disc K has a peripheral portion $K^1$ slightly projecting laterally, said portion $K^1$ being formed with a number of spaced claws $K^2$ of L section. Coils C, D of one coupling are fixed by rivets or otherwise to the peripheral portion $K^1$ of one disc as shown in Fig. 14. To the peripheral portion $K^1$ of the other disc are fixed either the coils of the second coupling or the end of the shaft A as the case may be. The claws of one disc are then introduced between the claws of the other disc and separation of the disc is prevented by the insertion of a split metal ring M between the claws as shown in Fig. 14. The claws of one disc fit exactly into the intervals between the claws of the other disc.

Figure 18:
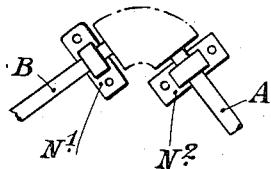
Figs. 18 to 22 illustrate various modes of application of the invention.

The above described coupling may be advantageously used in all cases in which a coupling having the features of a Cardan or universal joint is required. The coupling may, for instance, be used for conveying rotary motion from one shaft to another shaft arranged at any desired angle relatively to the first shaft. In the example illustrated in Fig. 18 the two shafts A and B are arranged approximately at an angle of 90°, the coupled ends of the shafts being carried in bearings $N^1$ and $N^2$ arranged at both ends of the interposed coupling.

Figure 19:
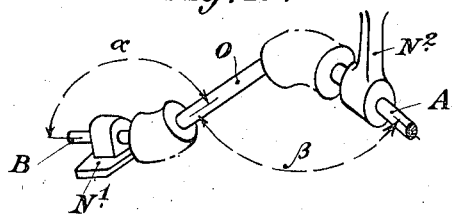

Fig. 19 shows an arrangement in which two couplings made in accordance with the invention are arranged at the two ends of an intermediate shaft O and are connected at the other ends to shafts A and B respectively. The bearing $N^2$ of the shaft A may be movable in relation to the bearing $N^1$ of the shaft B. The shafts B and O lie in one plane at an angle $\alpha$, and the shafts O and A are arranged in a different plane at an angle $\beta$.

Figure 20:
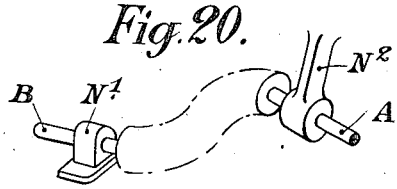

Fig. 20 shows an arrangement in which two shafts A and B not lying in the same plane are coupled by means of two or more couplings made according to the invention which are connected after having been bent into the required shape. The whole coupling has, in this arrangement, the form of an S and forms an intermediate bent flexible shaft.

Figure 21:
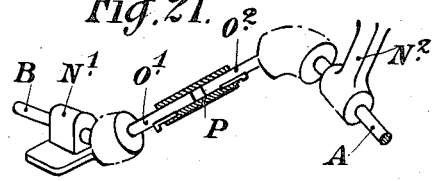

Fig. 21 shows a modification of the arrangement according to Fig. 19, in which the intermediate shaft is made of two halves $O^1$, $O^2$ slidably connected by an expansible coupling P of known kind. Assuming that in this arrangement the bearing $N^2$ should be free to move in relation to the bearing $N^1$, the mobility of the whole arrangement will be greater than in the arrangement according to Fig. 19.

Figure 22:
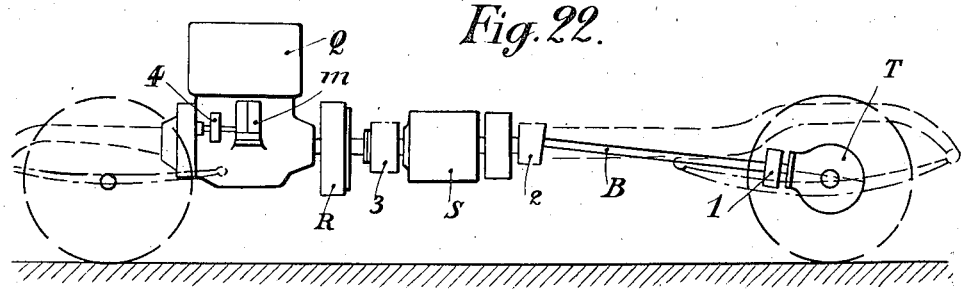

Fig. 22 shows the application of the invention to various parts of the chassis of a motor car. Q indicates the engine, R the flywheel, S the gear box, T the rear shaft, $m$ the magneto. B is the shaft through which the rear wheel shaft is connected to the gear box. Flexible couplings 1, 2 made according to the invention are arranged at the two ends of the shaft B. Another flexible coupling 3 made according to the invention may be arranged between the motor and the gear box, and a fourth coupling 4 may be interposed for driving the magneto. Further couplings may be used for driving the pump, the dynamo and other accessory devices such as the speedometer, and the like.

Figure 2:
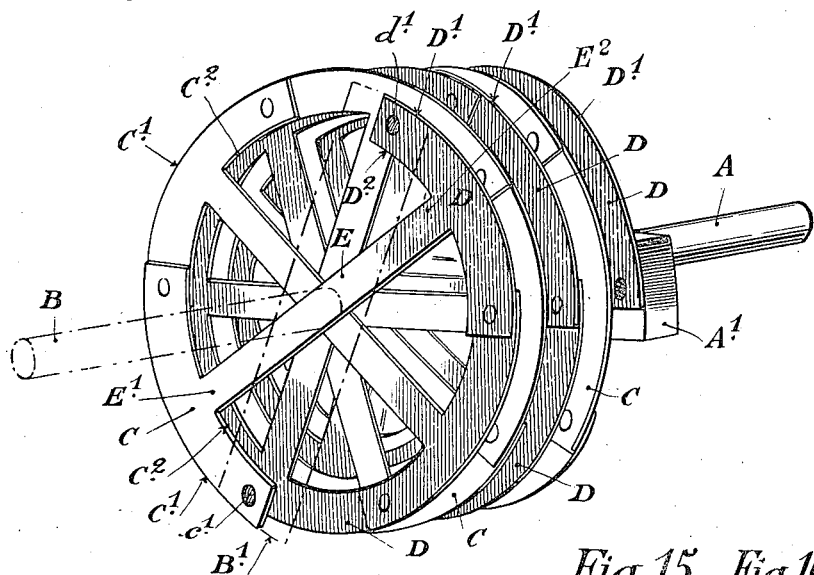
Fig. 2 is a perspective view of a construction according to Fig. 1.

The staying members such as E in Fig. 2 may, if desired, be provided or formed with central projections or bosses serving to limit the relative longitudinal or axial movement of the adjacent coils of the coupling. If required the bands or strips from which the helical springs are made may be formed with openings or cut-out portions for the purpose of reducing the weight, and the stiffening members may be likewise perforated or cut out in places, if required. It will be understood that any kind of helical coil may be used, the invention not being restricted to any particular form of the springs. The springs may be bent upon a core of any suitable or desired section.

I claim:

1. A flexible coupling for conveying rotary motion comprising a coil spring and staying means adapted to hold the coils against radial compression and against excessive deformation, substantially as described.

2. A flexible coupling for conveying rotary motion comprising a coil spring and staying means adapted to hold the coils against radial compression and against excessive deformation, said staying means consisting of diametrically extending members connecting opposite points of the coils.

3. A flexible coupling for conveying rotary motion comprising a coil spring formed of material of elongated cross section the longest axis of symmetry of said cross section being arranged approximately at right angles to the axis of the coil, and staying means adapted to hold the coils against radial compression and against excessive deformation.

4. A flexible coupling for conveying rotary motion comprising, a coil spring formed of material of elongated cross section, the longest axis of symmetry of said cross section being arranged approximately at right angles to the axis of the coil, and diametrically extending staying members connecting opposite points of the coils.

5. A flexible coupling for conveying rotary motion, comprising a multiple spring coil consisting of individual coils of the same pitch and shape, and staying members connecting diametrically opposite points of adjacent coils of different springs.

6. A flexible coupling for conveying rotary motion comprising a multiple spring coil consisting of individual coils of the same pitch and shape, said coils being formed of material of elongated cross section, the longest axis of symmetry of said cross section being arranged approximately at right angles to the axis of the coils, and staying members connecting diametrically opposite points of adjacent coils of different springs.

7. A flexible coupling for conveying rotary motion comprising spring coils which are built up of I-shaped elements the web of each element constituting a staying member whilst the flanges constitute sectors of the coils, substantially as described.

8. A flexible coupling for conveying rotary motion comprising spring coils built up of I-shaped elements, the web of each element constituting a staying member whilst the flanges constitute sectors of the coils, said I-shaped elements being riveted together by means of butt joints with double cover plates.

9. A flexible coupling for conveying rotary motion comprising coil springs constituted by I-shaped elements, the web of each element constituting a staying member whilst the flanges of the elements constitute the sectors of the coils, the said I-shaped elements being riveted together by means of double rivets having two shanks formed on a common die-head.

10. A flexible coupling for conveying rotary motion comprising a coil spring, staying means adapted to hold the coils against radial compression and against excessive deformation, said staying means consisting of diametrically extending members connecting opposite points of the coils, and an attaching device for attaching the flexible coupling to another flexible coupling or a shaft, said attaching device comprising two discs having interengaging L-shaped claws and a ring adapted to be inserted between the claws to prevent separation of the discs, said discs being provided with laterally projecting peripheral portions for the purpose of providing spaces for rivets or other means of attaching the coils to the discs.

11. A flexible coupling for conveying rotary motion comprising a coil spring, diametrically extending members connecting opposite points of the coils, so as to hold the coils against radial compression and against excessive deformation, said coupling being bent one or more times in such a manner as to cause it to follow a sinuous course in order to enable said coupling to be used to connect shafts arranged at an angle relatively to each other.

In testimony whereof I have hereunto set my hand.

HENRI PEIGNÉ.